US008935648B2

(12) United States Patent
Naouri

(10) Patent No.: US 8,935,648 B2
(45) Date of Patent: Jan. 13, 2015

(54) AT LEAST ONE DIE PRODUCED, AT LEAST IN PART, FROM WAFER, AND INCLUDING AT LEAST ONE REPLICATED INTEGRATED CIRCUIT

(75) Inventor: Ygdal Naouri, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/995,215

(22) PCT Filed: Mar. 16, 2012

(86) PCT No.: PCT/US2012/029315
§ 371 (c)(1),
(2), (4) Date: Jun. 18, 2013

(87) PCT Pub. No.: WO2013/137895
PCT Pub. Date: Sep. 19, 2013

(65) Prior Publication Data
US 2014/0198440 A1 Jul. 17, 2014

(51) Int. Cl.
*G06F 17/50* (2006.01)
*G06F 1/18* (2006.01)
*G06F 13/14* (2006.01)

(52) U.S. Cl.
CPC .............. *G06F 1/185* (2013.01); *G06F 13/14* (2013.01)
USPC ........... 716/124; 716/123; 716/125; 713/193; 726/19; 726/21

(58) Field of Classification Search
USPC ........ 716/123, 124, 125; 713/193; 726/19, 21
See application file for complete search history.

(56) References Cited

U.S. PATENT DOCUMENTS

| 7,290,224 B2 * | 10/2007 | Byrn et al. ..................... 716/102 |
| 7,519,941 B2 | 4/2009 | Bueti et al. |
| 8,775,997 B2 * | 7/2014 | Diamond ....................... 716/117 |
| 2004/0128626 A1 * | 7/2004 | Wingren et al. .................. 716/1 |

(Continued)

FOREIGN PATENT DOCUMENTS

WO 2013/137895 A1 9/2013

OTHER PUBLICATIONS

International Search Report and Written Opinion received for PCT Patent Application No. PCT/US2012/029315, mailed on Oct. 29, 2012, 9 pages.

(Continued)

*Primary Examiner* — Brian Ngo
(74) *Attorney, Agent, or Firm* — Christopher K. Gagne

(57) ABSTRACT

An embodiment may include at least one die produced, at least in part, from a wafer, and may include at least one integrated circuit and/or at least one other integrated circuit. These integrated circuits may be mutual replications of each other and may include respective core and additional blocks. Each respective core block may have an associated respective capability. As formed in the wafer, the respective additional blocks may be coupled together so as to permit the associated respective capabilities of the respective core blocks to be functionally combined to provide an increased capability relative to each of the associated respective capabilities considered separately, and also so as to permit the integrated circuits to be externally interfaced as a unified device. The wafer may be separable into respective dice including respective of the integrated circuits such that the integrated circuits include respective external interfaces. Many modifications are possible.

17 Claims, 3 Drawing Sheets

(56) References Cited

U.S. PATENT DOCUMENTS

2007/0073501 A1    3/2007   Bieswanger et al.
2008/0132007 A1    6/2008   Winegarden et al.
2009/0106483 A1*   4/2009   Cherpantier .................. 711/103
2010/0271071 A1   10/2010   Bartley et al.
2012/0068229 A1*   3/2012   Bemanian et al. ............ 257/209

OTHER PUBLICATIONS

International Preliminary Report on Patentability and Written Opinion received for PCT Patent Application No. PCT/US2012/029315, mailed on Sep. 25, 2014, 6 pages.

* cited by examiner

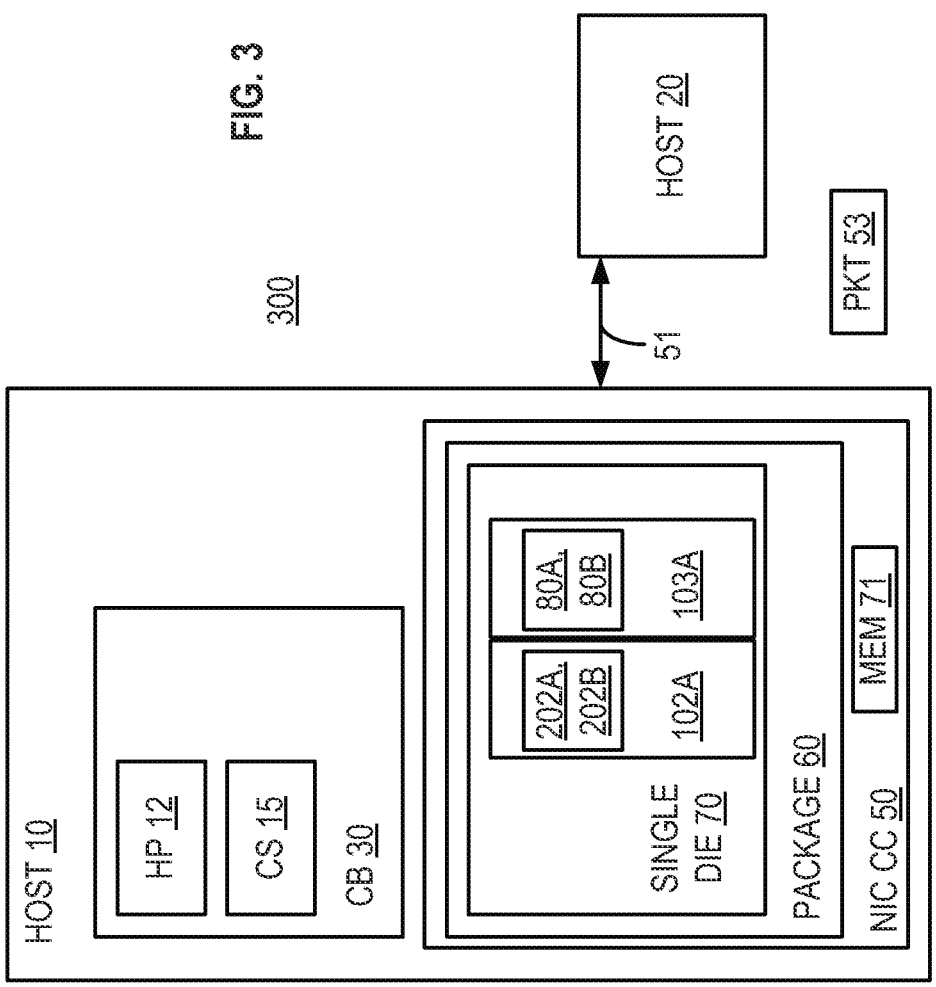

AT LEAST ONE DIE PRODUCED, AT LEAST IN PART, FROM WAFER, AND INCLUDING AT LEAST ONE REPLICATED INTEGRATED CIRCUIT

FIELD

This disclosure relates to at least one die produced, at least in part, from a wafer, and including at least one replicated integrated circuit.

BACKGROUND

In one conventional technique for fabricating input/output (I/O) port controller circuitry, a plurality of multi-port (e.g., dual port) controllers are formed in a substrate. In an attempt to provide enhanced flexibility in the uses to which the controllers may be put, each dual port controller includes fusible links that may be used to permanently disable all of the circuitry associated with one of ports (as well as other circuitry) in the dual port controller to make the dual port controller function as a single port controller. As can be readily appreciated, this wastes large amounts of the circuitry of each of the dual port controllers, and drives up the cost of providing a single port solution.

One proposed conventional attempt to address this problem involves mounting two single port controller dice in a single multi-chip package (MCP). This may increase the packaging costs to an unacceptable degree. Also, due to potential root complex communication issues, the controllers may not be usable with a network interface controller card that is to be deployed in a Peripheral Component Interconnect (PCI) Express (PCI-e) host environment.

BRIEF DESCRIPTION OF THE SEVERAL VIEWS OF THE DRAWINGS

Features and advantages of embodiments will become apparent as the following Detailed Description proceeds, and upon reference to the Drawings, wherein like numerals depict like parts, and in which:

FIG. 3 illustrates a system embodiment.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
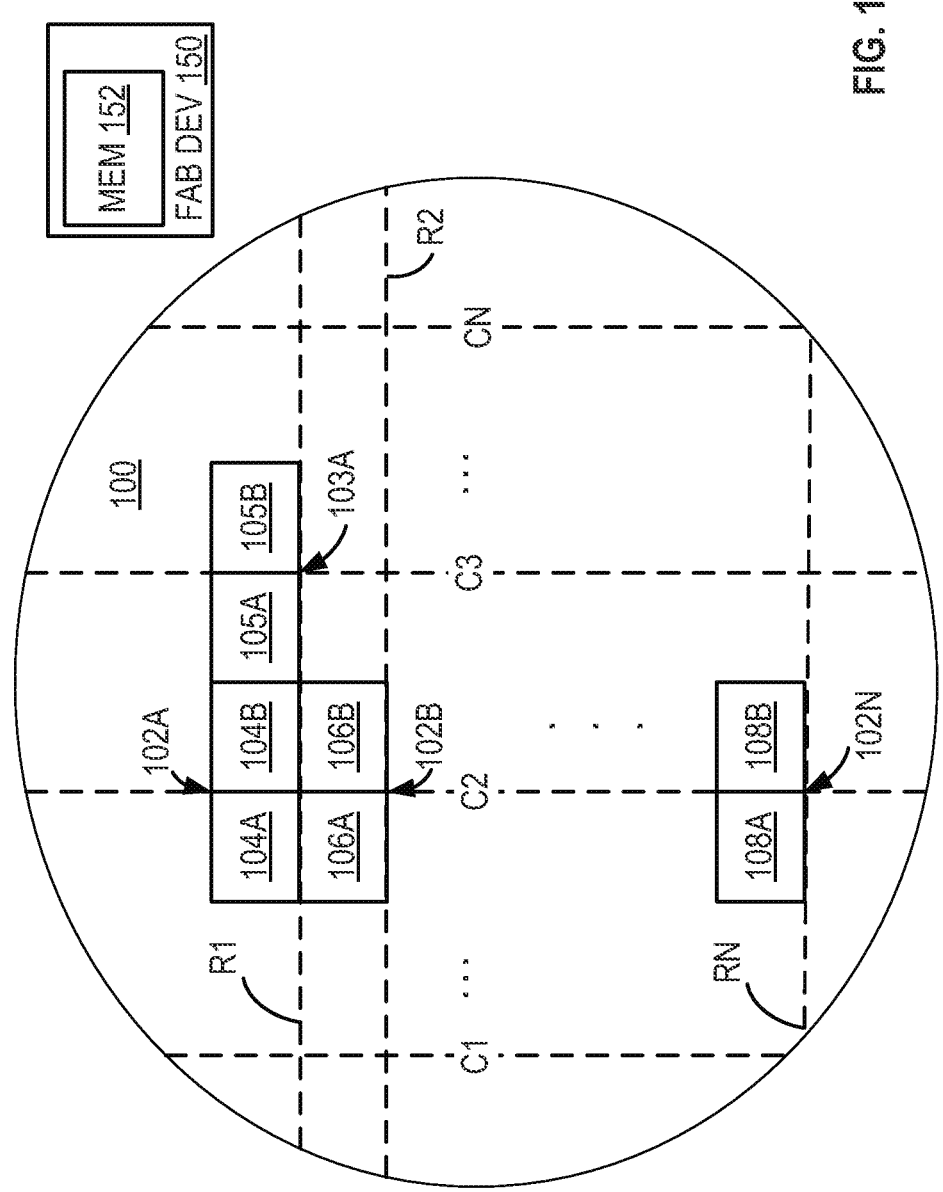
FIG. 1 illustrates wafer in an embodiment.

FIG. 1 illustrates a wafer 100 in an embodiment. In this embodiment, a wafer may be or comprise one or more portions of one or more substrates, such as, for example, a semiconductor substrate that may (1) comprise, at least in part, one or more microelectronic devices, integrated circuits, paths, and/or traces, and/or (2) into which and/or on which one or more microelectronic devices, integrated circuits, paths, and/or traces may be formed and/or produced, at least in part. In this embodiment, an integrated circuit and/or microelectronic device may be or comprise one or more circuits formed and/or produced, at least in part, in and/or on one or more substrates and/or dice. In this embodiment, one or more (and in this embodiment, a plurality of) dice 102A . . . 102N, 103A may be produced, at least in part, from the wafer 100. For example, in this embodiment, one or more dice 102A . . . 102N, 103A may be formed, at least in part, in and/or on the wafer 100, and thereafter, may be separated and/or segmented, at least in part, from at least certain other die in or on the wafer by using suitable means (e.g., sawing, etching, extracting, etc.). In this embodiment, a die may be or comprise one or more portions of a wafer, and/or may be or be comprised in a single integrated circuit chip and/or microelectronic device.

In this embodiment, the one or more dice 102A . . . 102N, 103A may be or comprise respective replications of each other. Each of these dice 102A . . . 102N, 103A may comprise multiple respective integrated circuits formed in respective dice. These respective integrated circuits may be respective replications of each other. For example, die 102A may comprise dice 104A, 104B; die 103A may comprise dice 105A, 105B; die 102B may comprise 106A, 106B; and, die 102N may comprise dice 108A, 108B. These dice 104A, 104B, 105A, 105B, 106A, 106B, and/or 108A, 108B may comprise respective, replicated integrated circuits.

In this embodiment, a first entity may be or comprise a replication of a second entity if the first entity is, comprises, and/or embodies the physical and/or functional layout, characteristics, capabilities, functionality, features, and/or components, of the second entity. The first entity may be or comprise a replication of the second entity, even if the two entities are not exact physical duplicates of each other, so long as differences between the respective replicated layouts, characteristics, capabilities, functionalities, features, and/or components do not result in material frustration of the respective purposes of the respective physical layouts, characteristics, capabilities, functionalities, features, and/or components. For example, if certain types of packaging are employed in connection with this embodiment (e.g., QFN (quad-flat no-leads) packaging), at least certain features (e.g., pad/lead/trace locations, surface mount considerations, device configurations/geometries, symmetries, etc.) may differ between mutual replications in order to accommodate the design considerations of such packaging.

Figure 2:
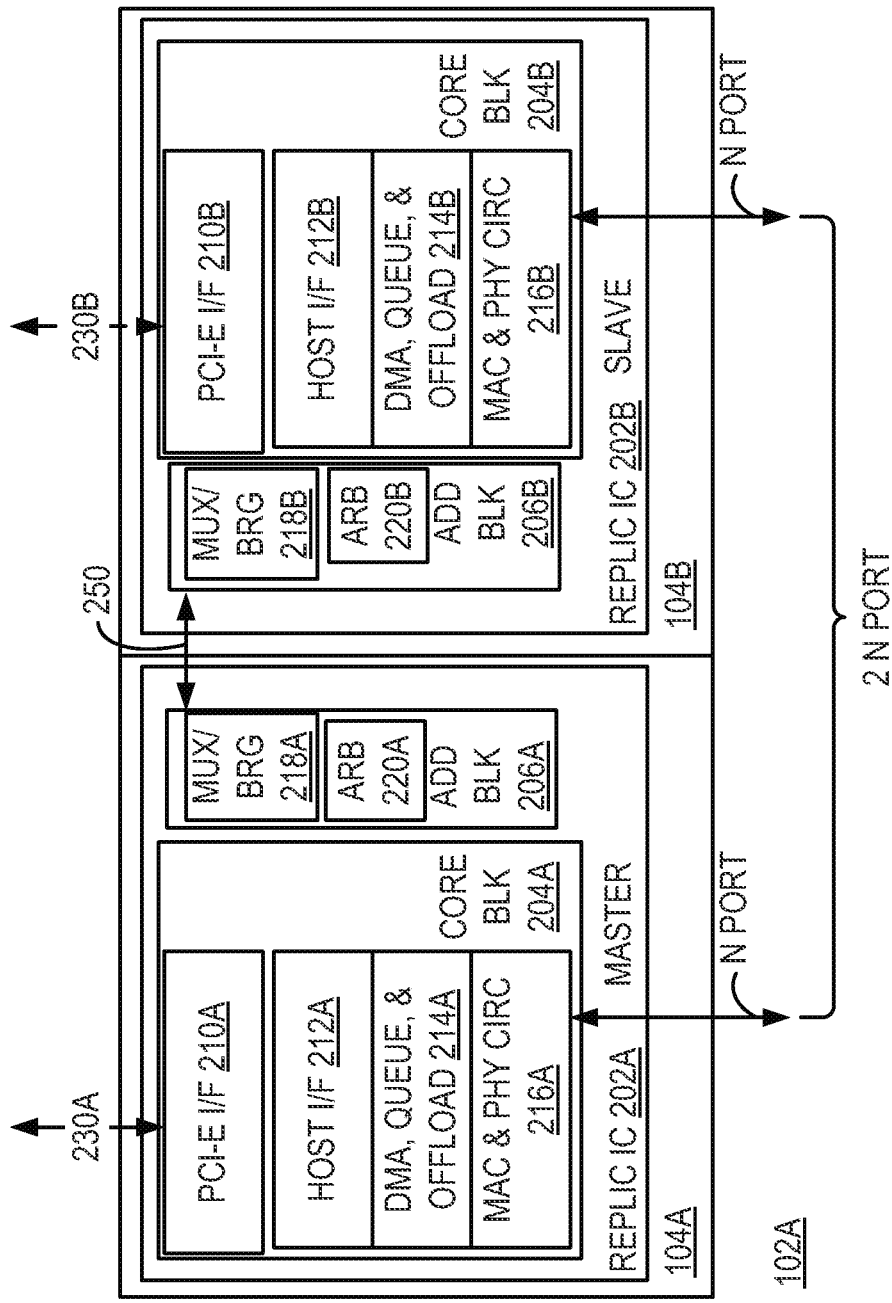
FIG. 2 illustrates features in an embodiment.

As shown in FIG. 2, die 102A may comprise dice 104A, 104B that may comprise integrated circuits 202A, 202B. Integrated circuits 202A, 202B may be or comprise mutual replications of each other. Thus, for example, one or more integrated circuits 202A may be or comprise one or more replications of one or more integrated circuits 202B.

The integrated circuits 202A, 202B may comprise respective core blocks 204A, 204B, and respective additional blocks 206A, 206B. In this embodiment, each of the respective core blocks 204A, 204B may have and/or be able to implement, at least in part, an associated respective capability. For example, in this embodiment, the respective core blocks 204A, 204B may be or comprise respective I/O port controller circuitry core blocks whose respective associated capabilities may comprise respective maximum port bandwidths and/or numbers of ports. For example, respective core blocks 204A, 204B may each have a respective maximum port bandwidth of 1 Gigabit per second and/or implement a respective N (e.g., single) Ethernet protocol port. This Ethernet protocol may comply and/or be compatible with Institute of Electrical and Electronics Engineers, Inc. (IEEE) Std. 802.3-2008, Dec. 26, 2008. Of course, many different, additional, and/or other protocols may be used without departing from this embodiment.

In order to permit the respective core blocks 204A, 204B to have and/or to be able to implement, at least in part, such respective capabilities, the respective core blocks 204A, 204B may comprise respective circuitry. For example, core block 204A may include PCI-e interface circuitry 210A that may be coupled to additional block 206A. Core block 204A also may be coupled (via block 206A) to host interface circuitry 212A comprised in core block 204A. DMA, queuing, and protocol offload processing circuitry 214A may be coupled to circuitry 212A and to medium access control (MAC) and physical layer circuitry 216A. In operation, PCI-e interface circuitry 210A may provide an interface to a PCI Express® interconnect protocol link 230A that may comply and/or be compatible with PCT-SIG PCIe Base 3.0 Specification, Nov. 18, 2010. This interface may permit exchange of data and/or commands with host interface 212A, circuitry 214A, and/or circuitry 216A in such a way as to permit host interface 212A, circuitry 214A, and/or circuitry 216 to operate in a manner that complies and/or is compatible with the Ethernet protocol described previously.

Core block 204B may include circuitry that may be capable, at least in part, of performing functions that may be analogous to the above functions of circuitry 210A, 212A, 214A, and/or 216A. For example, circuitry 210B, 212B, 214B, and/or 216B may be capable, at least in part, of performing respective functions that may be similar or identical to the above functions of circuitry 210A, 212A, 214A, and/or 216A. However, as is described below, the respective functionality of PCI-e interface circuitry 210A, 210B and/or additional blocks 206A, 206B may differ depending, at least in part, upon whether the respective additional blocks 206A, 206B are coupled together, or whether blocks 206A, 2066 (and/or dice 104A, 104B) are electrically and/or physically de-coupled from each other.

For example, as formed in the wafer 100, the respective additional blocks of respective groups of adjacent contiguous dice along individual rows or columns may be mutually coupled together. For example, as shown in FIG. 1, depending upon the particular implementation of wafer 100, the respective additional blocks in respective mutually contiguous pairs (or larger groups) of dice along respective rows R1, R2, and/or RN, or alternatively, along respective columns C1, C2, C3, and/or CN may be mutually coupled together. As will be described in greater detail, the respective additional blocks may include glue logic and/or other circuitry that may permit the respective integrated circuits that are coupled together by their respective additional blocks to operate together in one or more master/slave relationships that may permit (1) the associated respective capabilities of the respective core blocks of these respective integrated circuits to be functionally combined to provide an increased capability relative to each of the associated respective capabilities of these respective core blocks considered separately, and/or (2) the respective integrated circuits to be externally interfaced (e.g., in and/or by a host) as a single unified device (e.g., a single Ethernet and/or I/O port controller) via a single operational master external host interconnect interface. However, if respective additional blocks in respective integrated circuits are physically and/or electrically de-coupled from each other, the respective integrated circuits may not so operate together. If such de-coupling is present, the de-coupled integrated circuits may comprise respective operational external host interconnect interfaces, and the respective capabilities of their respective core blocks may not be so functionally combined.

Thus, returning to FIG. 2, as formed in the wafer 100, the respective additional blocks 206A, 206B may be coupled together so as to permit (1) the associated respective capabilities of the respective core blocks 204A, 204B to be functionally combined to provide an increased capability relative to each of the associated respective capabilities considered separately, and/or (2) the integrated circuits 202A, 202B to be externally interfaced (e.g., in and/or by a host that may comprise the die 102A) as a single unified device (e.g., a single Ethernet and/or I/O port controller) via a single operational master external host interconnect interface 210A. However, the wafer 100 also may be capable of being physically and/or electrically separated into respective dice, such that dice 104A, 104B and/or their respective integrated circuits 202A, 202B may be mutually physically and/or electrically separated and/or de-coupled from each other. If so separated, the integrated circuits 202A, 202B may comprise respective operational external host interconnect interfaces 210A, 210B, and/or the respective core blocks 204A, 204B may be separate devices (e.g., separate respective Ethernet and/or I/O port controllers, not in a master/slave relationship).

For example, the respective additional blocks 206A, 206B may comprise respective multiplexer/PCI-e bridge circuitry 218A, 218B and/or arbitration circuitry 220A, 220B that may be coupled together (e.g., as formed in the wafer 100), at least in part, via one or more ray distribution layer (and/or other) interconnect lines 250. When so coupled together, the circuitry 218A, 218B, 220A, 220B, and/or 206A, 206B may permit integrated circuits 202A, 202B to operate in a master/slave relationship in which one or more integrated circuits 202B may operate as one or more slaves, at least in part, of one or more integrated circuits 202A. In this master/slave relationship, circuitry 218A, 218B, 220A, 220B, and/or 206A, 206B may permit host interface circuitry 212A and 212B to communicate via PCI-e interface circuitry 210A and/or its single associated link 230A, but may prevent host interface 212B from communicating with and/or via PCI-e interface circuitry 210B. As a result, at least in part, the integrated circuits 202A, 202B may be externally interfaced (e.g., in and/or by a host that may comprise the die 102A) as a single unified device (e.g., a single addressable Ethernet and/or I/O port controller) via a single operational master external host interconnect interface 210A. Also as a result, at least in part, the associated respective capabilities of the respective core blocks 204A, 204B may be functionally combined to provide an increased capability relative to each of the associated respective capabilities considered separately. For example, the resulting single Ethernet and/or I/O port controller may exhibit as this increased capability (1) a maximum bandwidth that is the summation of (e.g., twice) the respective individual maximum bandwidths of the core blocks 204A, 204B, and/or (2) an increased number of ports (e.g., 2N or twice) the number of ports that each of the core blocks 204A, 204B may implement when taken individually.

In this master/slave relationship, the additional blocks 206A, 206B (e.g., arbitration circuitry 220A, 220B and/or multiplexer circuitry in circuitry 218A, 218B) may arbitrate, at least in part, respective accesses to memory (e.g., external flash or other memory 71 shown in FIG. 3) by respective components of integrated circuits 202A, 202B. Also in this master/salve relationship, the additional blocks 206A, 206B (and/or other not shown components) in integrated circuits 202A, 202B may permit various management related functions to be carried out via a single set (not shown) of management bus links and/or fines. Additionally, in this master/slave relationship, in operation, the unified external PCI-e interface 210A may have a relatively higher clock rate than (e.g., twice that of) relatively lower clock rates that may prevail for the respective interfaces 210A, 210B when the additional blocks 206A, 206B are de-coupled.

Conversely, if the master/slave relationship does not prevail between integrated circuits 202A, 202B (e.g., integrated circuits 202A, 202B and/or dice 104A, 104B have been physically and/or electrically de-coupled from each other and the other dice in wafer, thereby severing one or more lines 250), each of the integrated circuits 202A, 202B and/or each of the core blocks 204A, 204B may function, at least in part, as respective, individual N port controllers that may be interfaced and/or accessible via respective PCI-e interfaces 210A, 210B. In this case, the respective PCI-e interfaces 210A, 210B may be coupled to and/or be accessible via respective PCI-e links 230A, 230B.

As alluded to previously, without departing from this embodiment, depending upon the particular implementation of wafer 100 and/or the manner in which wafer 100 may be sawed to separate its dice, any number of respective integrated circuits and/or additional blocks may be coupled together. For example, FIG. 3 illustrates a system embodiment 300. System 300 may include, in a single, unified die 70, both dice 102A and 103A. That is, in this system embodiment 300, wafer 100 may be separated to produce die 70 that may comprise both dice 102A and 103A. Die 102A may comprise integrated circuits 202A, 202B. Die 103A may comprise integrated circuits 80A, 80B. Each of these integrated circuits 202A, 202B, 80A, 80B may be a respective replication of each of the other integrated circuits. The respective additional blocks of integrated circuits 202A, 202B, 80A, 80B may be coupled together so as to permit them to operate in a master/ (multiple) slave relationship in which integrated circuit 202A may be the master and the remaining integrated circuits 202B, 80A, 80B may be its slaves. As such, integrated circuits 202A, 202B, 80A, 80B may operate as a single unified Ethernet port controller that may have four times the bandwidth and four times (e.g., 4N) the number of ports of any of the individual respective integrated circuits (e.g., taken singly). This single unified Ethernet port controller may be interfaced and/or accessed (e.g., by host processor 12 and/or chipset 15 in host 10) via a single external host PCI-e interface (e.g., interface 210A).

In this system embodiment, die 70 may be a single integrated circuit chip that may be comprised (e.g., mounted) in a single ceramic, plastic, and/or resin/epoxy package 60 that may be comprised in a network and/or I/O controller circuit card 50. In the host 10, the circuit card 50 may be coupled (e.g., via the PCI-e link 230A) to a circuit board 30 that may comprise the host processor 12 and/or chipset 15. The circuit card 50 also may comprise, at least in part, memory 71. Alternatively or additionally, the circuit board 30 may comprise, at least in part, memory 71.

The single unified Ethernet port controller of this system embodiment 300 may be communicatively coupled via network communication links 51 to one or more hosts 20. This may permit host 10 to be able to exchange one or more packets 53 with one or more hosts 20 via the links 51.

In this embodiment, a first entity may be "communicatively coupled" to a second entity if the first entity is capable of transmitting to and/or receiving from the second entity one or more commands and/or data. In this embodiment, data and information may be used interchangeably, and may be or comprise one or more commands (for example one or more program instructions), and/or one or more such commands may be or comprise data and/or information. Also in this embodiment, an instruction may include data and/or one or more commands. In this embodiment, a packet may be or comprise one or more symbols and/or values In this embodiment, "circuitry" may comprise, for example, singly or in any combination, analog circuitry, digital circuitry, hardwired circuitry, programmable circuitry, co-processor circuitry, state machine circuitry, and/or memory that may comprise program instructions that may be executed by programmable circuitry. Also in this embodiment, a processor, host processor, central processing unit, processor core, core, and controller each may comprise respective circuitry capable of performing, at least in part, one or more arithmetic and/or logical operations, and/or of executing, at least in part, one or more instructions. Although not shown in the Figures, hosts 10 and/or 20 each may comprise at least one graphical user interface system that may comprise, e.g., a respective keyboard, pointing device, and display system that may permit a human user to input commands to, and monitor the operation of, hosts 10 and/or 20, system 300, and/or one or more components thereof.

In this embodiment, memory may comprise one or more of the following types of memories: semiconductor firmware memory, programmable memory, non-volatile memory, read only memory, electrically programmable memory, random access memory, flash memory, magnetic disk memory, optical disk memory, and/or other or later-developed computer-readable and/or writable memory. In this embodiment, a portion or subset of an entity may comprise all or less than all of the entity. In this embodiment, a set may comprise one or more elements.

Returning to FIG. 1, in this embodiment, one or more fabrication devices 150 may fabricate and/or produce, at least in part, the wafer 100 and/or the one or more die 102A . . . 102N, 103A that may be produced from wafer 100. For example, in this embodiment, information (e.g., comprising instructions, data, and/or other information) may be encoded, at least in part, in computer-readable (e.g., tape-out) memory 152 that may be accessed, at least in part, by one or more devices 150. When so accessed, this may result in one or more devices 150 performing operations that may result in the fabricating and/or producing, at least in part, of the wafer 100 and/or the one or more die 102A . . . 102N, 103A. Additionally or alternatively, these operations also may result, at least in part, the package 60, circuit card 50, and/or die 70 shown in FIG. 3.

Thus, an embodiment may include (1) at least one die produced, at least in part, from a wafer, (2) memory that may be used to produce the wafer, at least one die, a package comprising the at least one die, and/or the wafer, (3) the wafer itself, and/or (4) a method of producing the at least one die and/or wafer. The at least one die may include at least one integrated circuit and/or at least one other integrated circuit. These integrated circuits may be mutual replications of each other and may include respective core and additional blocks. Each respective core block may have an associated respective capability. As formed in the wafer, the respective additional blocks may be coupled together so as to permit the associated respective capabilities of the respective core blocks to be functionally combined to provide an increased capability relative to each of the associated respective capabilities considered separately, and also so as to permit the integrated circuits to be externally interfaced as a unified device. The wafer may be separable into respective dice including respective of the integrated circuits such that the integrated circuits include respective external interfaces.

Thus, in an embodiment, by either separating or not separating the integrated circuits, the integrated circuits may be made either to operate as a single unified device (and as a result to provide the increased capabilities), or to operate separately (and thereby not to provide the increased capabilities). Potentially advantageously, this permits this embodiment to offer enhanced flexibility in terms of the uses to which the integrated circuits may be put, without wasting excessively large amounts of circuitry, and without prohibitively driving up the cost of providing the multiple uses to which the integrated circuits may be put. Further potentially advantageously, in this embodiment, these integrated circuits may be comprised in a single integrated circuit chip that may be comprised in a single package, thereby obviating the use of a MCP. This may permit this embodiment to offer reduced packaging costs, and may permit this embodiment to be used in a network interface controller card that is to be deployed in a PCI-e host environment. Further potentially advantageously, ray distribution lines 250 may exhibit reduced susceptibility to corrosion compared to other types of interconnects.

Many modifications are possible. For example, embodiments may be potentially used to advantage in connection with circuitry and/or devices other than port and/or I/O controllers. Also, for example, in environments in which integrated circuits 202A, 202B are to be used in a single unified device in a local area network (LAN) on motherboard (LOM) solution, additional blocks 206A, 206B may permit both PCI-e interfaces 210A, 210B to be operational contemporaneously. Additionally or alternatively, additional blocks 206A, 206B may be capable of routing external clock signals to components of the integrated circuits 202A, 202B. Additionally or alternatively, the master PCT-e interface 210A (and/or the slave PCI-e interface 210B) may include twice the number of data lanes than ordinarily would be comprised if the integrated circuits 202A, 202B were only to be operated separately. Further alternatively or additionally, interconnections between the integrated circuits 202A, 202B may be made, at least in part, via package 60. Additionally or alternatively, wafer 100 may be sawed to produce both heterogeneous devices (e.g., one or more N port controllers and one or more 2N port controllers, etc.), or conversely, wafer 100 may be sawed to produce only homogeneous devices (e.g., all N port or 2N port controllers).

Additionally or alternatively, if flip chip dice are employed, pads may be placed at desired locations/regions on the surfaces of the dice. Conversely, however, if QFN packaging is employed, and the replicated integrated circuits 202A, 202B are to operate as a 2N port controller, then no functional pads may be placed along the internal conjoined sides of the dice 104A, 104B (e.g., in-between the integrated circuits 202A, 202B). Instead, in this QFN 2N port controller configuration, all functional pads for the unified device may be placed along the outer perimeter region of die 102A. Also in this configuration, the integrated circuits 202A, 202B and/or their respective associated pads may be placed head-to-tail, or alternatively, as mirror image reflections of each other in the die 102A.

Many other and/or additional modifications, variations, and/or alternatives are possible without departing from this embodiment. Accordingly, this embodiment should be viewed broadly as encompassing all such alternatives, modifications, and variations.

What is claimed is:

1. An apparatus comprising:
at least one die produced, at least in part, from a wafer, the at least one die comprising at least one of: at least one integrated circuit and at least one other integrated circuit;
the at least one integrated circuit being at least one replication of the at least one other integrated circuit, the integrated circuits including respective core blocks and respective additional blocks, each respective core block having an associated respective capability;
as formed in the wafer, the respective additional blocks of the integrated circuits being coupled together so as to permit the associated respective capabilities of the respective core blocks to be functionally combined to provide an increased capability relative to each of the associated respective capabilities considered separately, and also so as to permit the integrated circuits to be externally interfaced as a unified device; and
the wafer being capable of being separated into respective dice comprising respective of the integrated circuits such that the integrated circuits include respective external interfaces;
the increased capability comprises a summation of the respective maximum bandwidth;
the respective additional blocks permitting the at least one integrated circuit to be a slave, at least in part, of the at least one other integrated circuit.

2. The apparatus of claim 1, wherein:
the at least one die comprises the respective dice;
the respective external interfaces include respective peripheral component interconnect (PCI) express (PCI-e) interfaces; and
the respective additional blocks include respective PCI-e bridge circuitry that, when coupled, permit the integrated circuits to be interfaced as the unified device via a single PCI-e link.

3. The apparatus of claim 1, wherein:
the respective core blocks comprise respective port controller circuitry;
the associated respective capabilities comprise respective maximum bandwidths.

4. The apparatus of claim 1, wherein:
the at least one die comprises a single die that comprises both the at least one integrated circuit and the at least one other integrated circuit;
the respective additional blocks include arbitration circuitry to arbitrate access to memory;
the respective additional blocks include multiplexer circuitry to permit, at least in part, the at least one integrated circuit to be slaved to the at least one other integrated circuit at least for purposes of providing a unified external interface to permit the integrated circuits to be externally interfaced as the unified device; and
the respective additional blocks are coupled together, at least in part, via one or more ray distribution layer interconnect lines.

5. The apparatus of claim 4, wherein:
the unified external interface is to have a relatively higher clock rate than a relatively lower clock rate of the respective external interfaces;
the at least one integrated circuit and the at least one other integrated circuit each comprise a respective plurality of integrated circuits; and
each of the respective plurality of integrated circuits is a respective replication of the at least one integrated circuit.

6. The apparatus of claim 1, further comprising:
a package that comprises the at least one die;
a circuit card that comprises the package;
a circuit board that is to be coupled to the circuit card; and
at least one die is a single die.

7. A method comprising:
producing, at least in part, by at least on fabrication device, from a wafer at least one die that comprises at least one of: at least one integrated circuit and at least one other integrated circuit;
the at least one integrated circuit being at least one replication of the at least one other integrated circuit, the integrated circuits including respective core blocks and respective additional blocks, each respective core block having an associated respective capability;
as formed in the wafer, the respective additional blocks of the integrated circuits being coupled together so as to permit the associated respective capabilities of the respective core blocks to be functionally combined to provide an increased capability relative to each of the associated respective capabilities considered separately, and also so as to permit the integrated circuits to be externally interfaced as a unified device; and the wafer being capable of being separated into respective dice comprising respective of the integrated circuits such that the integrated circuits include respective external interfaces;

the increased capability comprises a summation of the respective maximum bandwidth;

the respective additional blocks permitting the at least one integrated circuit to be a slave, at least in part, of the at least one other integrated circuit.

8. The method of claim 7, wherein:
the at least one die comprises the respective dice;
the respective external interfaces include respective peripheral component interconnect (PCI) express (PCI-e) interfaces; and
the respective additional blocks include respective PCI-e bridge circuitry that, when coupled, permit the integrated circuits to be interfaced as the unified device via a single PCI-e link.

9. The method of claim 7, wherein:
the respective core blocks comprise respective port controller circuitry;
the associated respective capabilities comprise respective maximum bandwidths.

10. The method of claim 7, wherein:
the at least one die comprises a single die that comprises both the at least one integrated circuit and the at least one other integrated circuit;
the respective additional blocks include arbitration circuitry to arbitrate access to memory;
the respective additional blocks include multiplexer circuitry to permit, at least in part, the at least one integrated circuit to be slaved to the at least one other integrated circuit at least for purposes of providing a unified external interface to permit the integrated circuits to be externally interfaced as the unified device; and
the respective additional blocks are coupled together, at least in part, via one or more ray distribution layer interconnect lines.

11. The method of claim 10, wherein:
the unified external interface is to have a relatively higher clock rate than a relatively lower clock rate of the respective external interfaces;
the at least one integrated circuit and the at least one other integrated circuit each comprise a respective plurality of integrated circuits; and
each of the respective plurality of integrated circuits is a respective replication of the at least one integrated circuit.

12. The method of claim 7, wherein:
a package comprises the at least one die;
a circuit card comprises the package;
a circuit board is to be coupled to the circuit card; and
at least one die is a single die.

13. An apparatus comprising:
a wafer from which is to be produced at least one die, as formed in the wafer the at least one die comprising at least one of: at least one integrated circuit and at least one other integrated circuit;

the at least one integrated circuit being at least one replication of the at least one other integrated circuit, the integrated circuits including respective core blocks and respective additional blocks, each respective core block having an associated respective capability;

as formed in the wafer, the respective additional blocks of the integrated circuits being coupled together so as to permit the associated respective capabilities of the respective core blocks to be functionally combined to provide an increased capability relative to each of the associated respective capabilities considered separately, and also so as to permit the integrated circuits to be externally interfaced as a unified device; and the wafer being capable of being separated into respective dice comprising respective of the integrated circuits such that the integrated circuits include respective external interfaces;

the increased capability comprises a summation of the respective maximum bandwidth;

the respective additional blocks permitting the at least one integrated circuit to be a slave, at least in part, of the at least one other integrated circuit.

14. The apparatus of claim 13, wherein:
the at least one die comprises the respective dice;
the respective external interfaces include respective peripheral component interconnect (PCI) express (PCI-e) interfaces; and
the respective additional blocks include respective PCI-e bridge circuitry that, when coupled, permit the integrated circuits to be interfaced as the unified device via a single PCI-e link.

15. The apparatus of claim 13, wherein:
the respective core blocks comprise respective port controller circuitry;
the associated respective capabilities comprise respective maximum bandwidths.

16. The apparatus of claim 13, wherein:
the at least one die comprises a single die that comprises both the at least one integrated circuit and the at least one other integrated circuit;
the respective additional blocks include arbitration circuitry to arbitrate access to memory;
the respective additional blocks include multiplexer circuitry to permit, at least in part, the at least one integrated circuit to be slaved to the at least one other integrated circuit at least for purposes of providing a unified external interface to permit the integrated circuits to be externally interfaced as the unified device; and
the respective additional blocks are coupled together, at least in part, via one or more ray distribution layer interconnect lines.

17. The apparatus of claim 16, wherein:
the unified external interface is to have a relatively higher clock rate than a relatively lower clock rate of the respective external interfaces;
the at least one integrated circuit and the at least one other integrated circuit each comprise a respective plurality of integrated circuits; and
each of the respective plurality of integrated circuits is a respective replication of the at least one integrated circuit.

* * * * *